W. H. FENOUGHTY.
BATTERY.
APPLICATION FILED MAY 12, 1913.
1,075,556.
Patented Oct. 14, 1913.
2 SHEETS—SHEET 1.
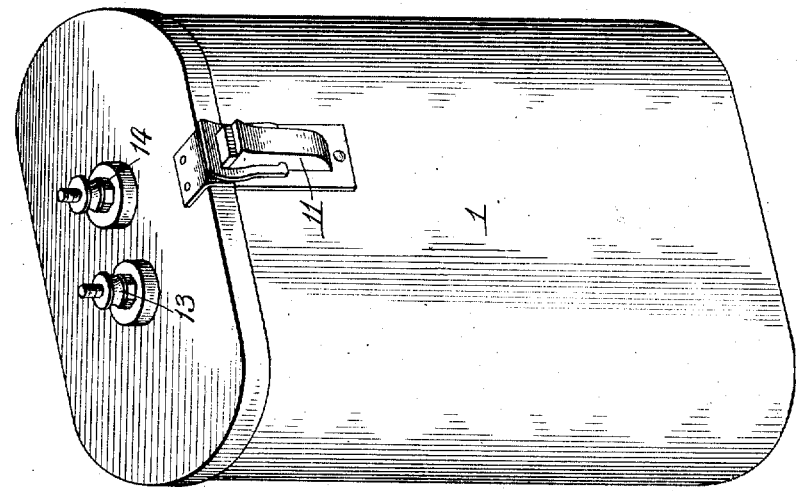
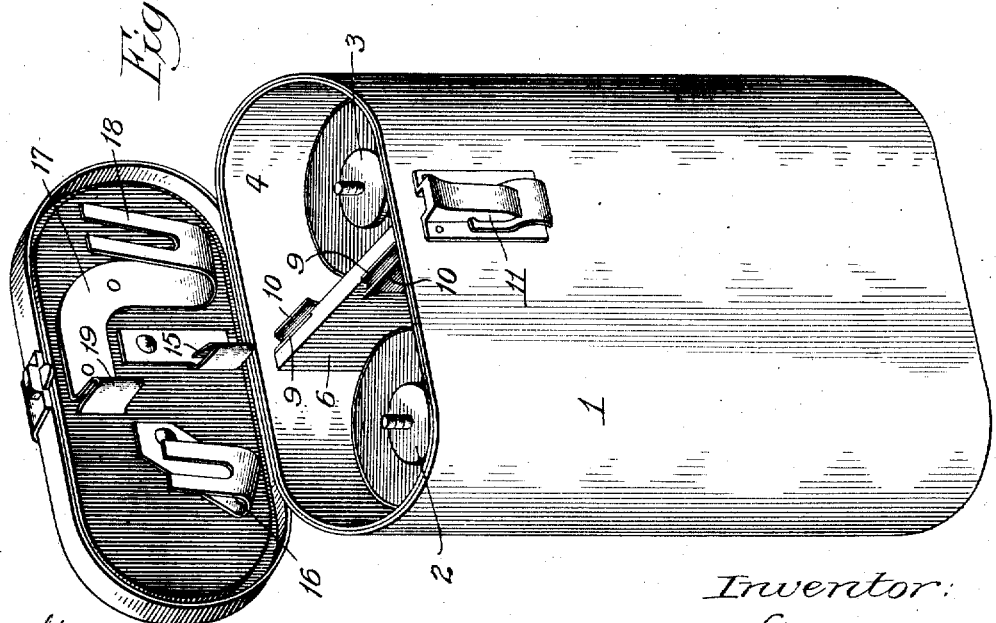
Witnesses.
John Enders
M. E. Martin
Inventor:
William H. Fenoughty,
by Arba B. Marvin
Atty.

W. H. FENOUGHTY.
BATTERY.
APPLICATION FILED MAY 12, 1913.

1,075,556.

Patented Oct. 14, 1913.

2 SHEETS—SHEET 2.

Witnesses:
John Enders
M. E. Martin

Inventor:
William H. Fenoughty
by Arba B. Marvin
Atty.

UNITED STATES PATENT OFFICE.

WILLIAM H. FENOUGHTY, OF BELLEVILLE, ILLINOIS, ASSIGNOR TO AMERICAN CARBON & BATTERY COMPANY, A CORPORATION OF MISSOURI.

BATTERY.

1,075,556.  Specification of Letters Patent.  Patented Oct. 14, 1913.

Application filed May 12, 1913. Serial No. 766,976.

*To all whom it may concern:*

Be it known that I, WILLIAM H. FENOUGHTY, a citizen of the United States, residing at Belleville, in the county of St. Clair and State of Illinois, have invented new and useful Improvements in Batteries, of which the following is a specification.

The present invention relates to batteries and more particularly to a device whereby a plurality of dry cells of usual construction, may be received and protected and when once slipped into position are so related to the conducting springs and like members of the container, that they are automatically connected up in proper manner as soon as the container is closed.

To obtain these and other objects, the invention comprises a weather proof casing, suitable for convenient transportation and adapted for use in connection with automobiles, motor boats, etc., where a portable and rugged battery equipment is desirable, this container being divided into compartments, into each of which a dry cell of usual construction may be introduced, the container also being provided with a cover carrying springs, clips, and switch elements, whereby the closing of the cover can be made to connect the dry cells in series or series multiple without the necessity for manipulating any binding posts or terminals of the cells.

The details of the invention will become clear from the following description, which is to be taken in conjunction with the accompanying drawings, wherein—

Figure 3:
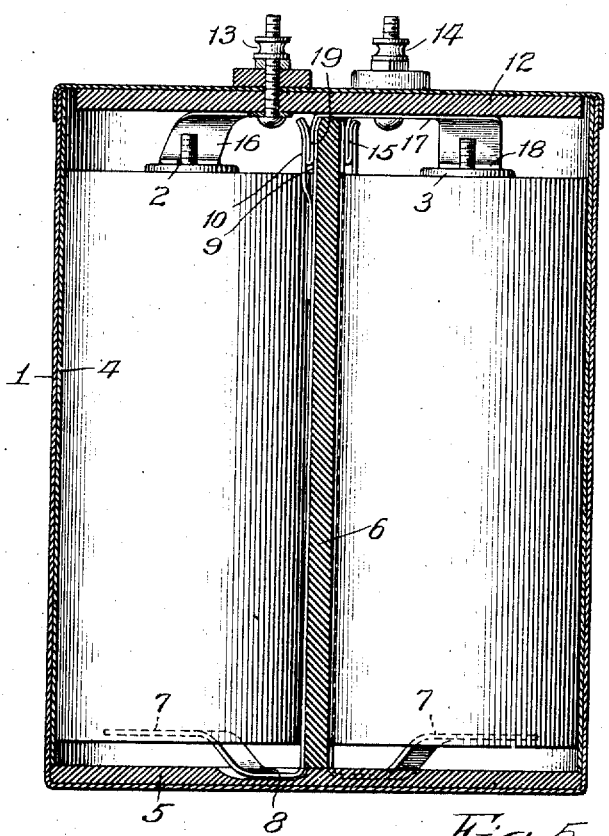
Figure 4:
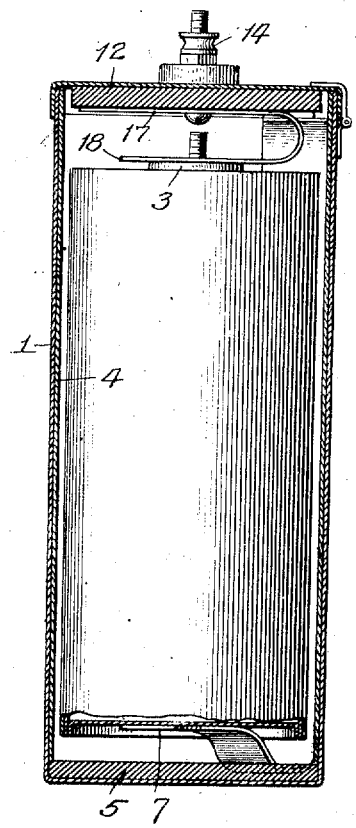
Figure 5:
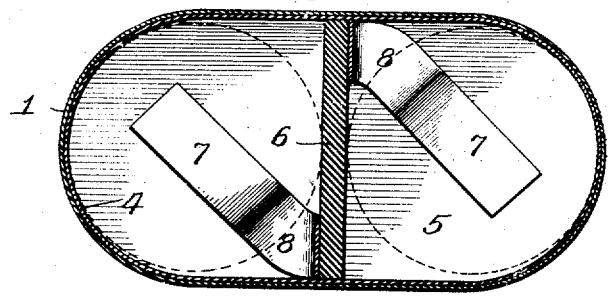

Figure 1 is a perspective view of one embodiment of the invention, showing the container with its cover closed. Fig. 2 is a similar view with the cover closed. Fig. 3 is a sectional elevation through the structure shown in Fig. 2. Fig. 4 is an end sectional elevation of the same, and Fig. 5 is a transverse section showing the cells as viewed from below.

In the modification illustrated, the device comprises a container 1 which preferably is of sheet metal, oval in shape and of suitable size to receive two dry cells 2 and 3. Each of these cells may be of ordinary construction with a zinc envelop and a carbon rod with a brass terminal cap and stud. The sheet metal container 1, preferably has its side walls lined with suitable insulating material, such as a layer 4 of fiber or the like, and the bottom of the container may be covered with a heavy plate 5 of fiber. A partition 6 arranged transversely of the container, divides it into two compartments and separates the dry cells, one from the other. Extending diagonally across the bottom of each compartment and adapted to bear on the zinc bottom of the dry cell is a spring contact finger 7 of copper, brass or the like, which has its down-turned portion 8 seated and held in a slot in the fiber bottom of the compartment, this member extending upwardly along the partition of the container to the top thereof, where it terminates in a contact plate 9, which is supplemented by a short side plate 10, spaced therefrom and forming therewith a spring clip to receive a contact member carried by the cover.

The cover for the container may be suitably hinged and may be provided at its front with a lock 11. The cover is preferably of sheet metal, shaped to form a weather proof closure for the top of container 1 and lined with a fiber block 12, surmounted by a pair of terminals 13 and 14 of usual construction, insulated from the sheet metal top and having their studs extended through to engage and establish electrical connection with contact plates carried on the under face of the insulating block 12. Terminal 14 is connected with a contact plate 15 which is cut and shaped to form a switch blade, adapted to swing down into contact with the adjacent conductor on the container partition. Terminal 13 is connected with a metal strip 16, which is shaped with a return bend and has its forked end positioned to swing down into contact with the brass terminal cap of the battery cell 2, the forked end of the plate straddling the screw stud, which in ordinary practice is to be found on the dry cell. In addition to the plates 15 and 16, there is provided another plate or strip 17, serving as a cross connection from one cell to the other. This plate is bent as shown in Fig. 1 and is provided at one end with a forked end 18 for contact with the brass cap of the carbon electrode of cell 3 and has its other end 19 shaped into a spring clip adapted to swing down between the blades 9 and 10 of the conductor leading to the bottom of the battery cell 2.

With the cover raised, as shown in Fig. 1, the battery cells are disconnected from one another and from the wires which may be permanently attached to binding posts 13 and 14. When the cover is swung down into operative position, the spring conductor 17 seats on the cap of cell 2, establishing connection between the binding post 13 and the carbon electrode and at the same time plate 15 goes in between its adjacent switch plates 9 and 10, establishing connection between terminal 14 and a zinc electrode, and at the same time the member 17 establishes a cross connection between the zinc electrode of cell 2 and the carbon electrode of cell 3, thereby putting the two cells in series and impressing on the terminals 13 and 14, the total voltage of the two cells. The arrangement is such that new cells can be slipped into place as renewals for old ones, and similar changes and adjustments may be made without disconnecting the current delivery wires from terminals 13 and 14 and without the inconvenience of adjusting any studs or terminal caps. Within the container, the connecting and disconnecting action is wholly automatic and dependent on the position of the cover, whether closed or open.

I claim:—

1. A container shaped to receive a pair of dry cells, a conductor contacting with the bottom of each of said cells and terminating near the top thereof in a contact device, a hinged cover for said container, terminals carried thereby, a pair of plates positioned on said cover to establish connection with suitable electrodes of said cells when the cover is swung into closed position, and a cross connecting plate also carried by said cover and effective when the cover is closed to place said cells in series across said terminals by connecting one inner electrode with a conductor contacting with the bottom of the adjacent cell.

2. The combination of a weather proof metal container having a hinged cover, said container being divided into a pair of compartments and insulated to receive and hold a pair of dry cells, a conductive member whereon each cell rests, said members extending upward to the top of said partition and terminating in a contact device, a cross connecting member carried by said cover and operative when the cover is closed to connect one of said contact devices with the center electrode of an adjacent cell, terminals carried by said cover and contact plates positioned to connect said cells in series across said terminals when the cover is swung into closed position.

3. In combination, a weather proof container having a hinged cover, a plurality of dry cells in said container and each resting in contact with a conductive strip which terminates near the top of the cell in a contact blade, a pair of terminals carried by said cover, a spring plate connected to one of said terminals and adapted to swing into contact with a center electrode of one of said cells, a plate connected with the other terminal and positioned to contact with the blade of the conductor leading to the bottom of the adjacent cell, and a cross connection carried by said cover and positioned to establish contact between adjacent cells when the cover of the container is closed.

4. The combination of a container divided into a plurality of compartments, a dry cell in each compartment, a resilient contact strip whereon each cell rests, said strips terminating near the top of said container in suitable contact devices, a cover for said container, terminals carried by said cover, resilient metal strips carried by said cover and positioned to contact respectively with the center electrodes of said cells, one of said strips being positioned to serve as a cross connection between said cells, and a third metal strip carried by said cover and permanently in connection with one of said terminals.

5. A container for dry batteries comprising a weather proof oblong envelop having a hinged cover and a non-conductive lining, a partition dividing said envelop into two compartments wherein dry cells may be received and protected, a metal strip for each compartment with which the outer electrode of the cell may contact, the upper ends of said strips being shaped to form contact clips, a pair of terminals carried by said cover and three metal strips carried by the insulating lining of said cover, one of said strips serving as a cross connection between said cells when the cover is closed and the other strips serving to connect said terminals respectively with the appropriate electrodes of said cells.

6. The combination of a weather proof container divided into compartments and having a cover, said compartments being each adapted to receive and protect a dry cell, a metal plate in each compartment whereon the cell may rest, a conductor leading from said supporting plate to the top of the container, a pair of terminals carried by said cover, a spring clip connected with one of said terminals and having its bifurcated end positioned to yieldingly contact with the center electrode of one of said cells, a cross connection carried by said cover and having a bifurcated end positioned to contact with and establish a connection to a central electrode of another cell, and a third conductor carried by said cover and arranged to establish connection between the second terminal and one of the battery electrodes when the cover is closed.

7. The combination of a weather proof metal container having a hinged cover and means for locking said cover in closed position, said container being of oval shape with a transverse partition forming compartments adapted to receive a pair of dry cells, a dry cell in each of said compartments, a conductive strip for each compartment contacting with the bottom of the zinc container in that compartment and extending upwardly to the top of said partition and terminating in a contact clip, terminals carried by the cover of said container, a spring strip connected to one of said terminals and positioned to swing into contact with the center electrode of one of said cells when the cover is closed, a plate connected with the other terminal and positioned to contact with one of the conductors carried by said partition, and a resilient cross connection carried by said cover and shaped to establish yielding contact with the center electrode of the other cell and also engaging one of the conductors carried by the partition of the container and thereby serving to connect and disconnect the center electrode of one cell from the outer electrode of the adjacent cell whenever the cover is swung into closed position.

In witness whereof, I hereunto subscribe my name to this specification in the presence of two witnesses.

WILLIAM H. FENOUGHTY.

Witnesses:
CARL HAMBUCHEN,
CHAS. O. MAYER.

---

Correction in Letters Patent No. 1,075,556.

It is hereby certified that in Letters Patent No. 1,075,556, granted October 14, 1913, upon the application of William H. Fenoughty, of Belleville, Illinois, for an improvement in "Batteries," an error appears in the printed specification requiring correction as follows: Page 1, line 39, for the word "closed" read *raised;* and that the said Letters Patent should be read with this correction therein that the same may conform to the record of the case in the Patent Office.

Signed and sealed this 11th day of November, A. D., 1913.

[SEAL.]

R. T. FRAZIER,
*Acting Commissioner of Patents.* sition, said container being of oval shape with a transverse partition forming compartments adapted to receive a pair of dry cells, a dry cell in each of said compartments, a conductive strip for each compartment contacting with the bottom of the zinc container in that compartment and extending upwardly to the top of said partition and terminating in a contact clip, terminals carried by the cover of said container, a spring strip connected to one of said terminals and positioned to swing into contact with the center electrode of one of said cells when the cover is closed, a plate connected with the other terminal and positioned to contact with one of the conductors carried by said partition, and a resilient cross connection carried by said cover and shaped to establish yielding contact with the center electrode of the other cell and also engaging one of the conductors carried by the partition of the container and thereby serving to connect and disconnect the center electrode of one cell from the outer electrode of the adjacent cell whenever the cover is swung into closed position.

In witness whereof, I hereunto subscribe my name to this specification in the presence of two witnesses.

WILLIAM H. FENOUGHTY.

Witnesses:
CARL HAMBUCHEN,
CHAS. O. MAYER.

---

Correction in Letters Patent No. 1,075,556.

It is hereby certified that in Letters Patent No. 1,075,556, granted October 14, 1913, upon the application of William H. Fenoughty, of Belleville, Illinois, for an improvement in "Batteries," an error appears in the printed specification requiring correction as follows: Page 1, line 39, for the word "closed" read *raised;* and that the said Letters Patent should be read with this correction therein that the same may conform to the record of the case in the Patent Office.

Signed and sealed this 11th day of November, A. D., 1913.

[SEAL.]

R. T. FRAZIER,
*Acting Commissioner of Patents.*

Correction in Letters Patent No. 1,075,556.

It is hereby certified that in Letters Patent No. 1,075,556, granted October 14, 1913, upon the application of William H. Fenoughty, of Belleville, Illinois, for an improvement in "Batteries," an error appears in the printed specification requiring correction as follows: Page 1, line 39, for the word "closed" read *raised;* and that the said Letters Patent should be read with this correction therein that the same may conform to the record of the case in the Patent Office.

Signed and sealed this 11th day of November, A. D., 1913.

[SEAL.]

R. T. FRAZIER,

*Acting Commissioner of Patents.*